US011223962B2

(12) United States Patent
Pandey et al.

(10) Patent No.: US 11,223,962 B2
(45) Date of Patent: Jan. 11, 2022

(54) DYNAMIC CHANNEL ASSIGNMENT DRIVEN BY CLIENT ANALYTICS

(71) Applicant: Cisco Technology, Inc., San Jose, CA (US)

(72) Inventors: Santosh Ghanshyam Pandey, Fremont, CA (US); Vishal Satyendra Desai, San Jose, CA (US); Jerome Henry, Pittsboro, NC (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 16/542,056

(22) Filed: Aug. 15, 2019

(65) Prior Publication Data
US 2021/0051486 A1 Feb. 18, 2021

(51) Int. Cl.
| | |
|---|---|
| *H04L 5/00* | (2006.01) |
| *H04W 36/00* | (2009.01) |
| *H04W 52/36* | (2009.01) |
| *H04W 16/26* | (2009.01) |
| *H04W 24/10* | (2009.01) |
| *H04W 72/04* | (2009.01) |
| *H04W 40/24* | (2009.01) |
| *H04L 1/00* | (2006.01) |

(52) U.S. Cl.
CPC .......... *H04W 16/26* (2013.01); *H04L 1/0026* (2013.01); *H04W 24/10* (2013.01); *H04W 40/244* (2013.01); *H04W 72/0446* (2013.01)

(58) Field of Classification Search
CPC ..... H04L 5/0057; H04L 1/0026; H04L 5/006; H04L 5/001; H04W 16/26; H04W 52/34; H04W 36/0066; H04W 24/02; H04W 16/14; H04W 52/243; H04W 88/08; H04W 24/10; H04W 40/244; H04W 72/0446; H04B 17/318
USPC ........................................................ 370/329
See application file for complete search history.

(56) References Cited

U.S. PATENT DOCUMENTS

| | | |
|---|---|---|
| 7,554,962 B2 | 7/2009 | Takeuchi |
| 9,282,588 B2 | 3/2016 | Novak et al. |
| 9,872,233 B2 | 1/2018 | Jeon et al. |

(Continued)

OTHER PUBLICATIONS

Allen Huotari, Why the 802.11k and Neighbor Report are Important? Cisco Blog, Wireless and Mobility, Apr. 13, 2015. https://blogs.cisco.com/wireless/why-the-802-11k-and-neighbor-report-are-important.

(Continued)

*Primary Examiner* — Edan Orgad
*Assistant Examiner* — Vanneilian Lalchinthang
(74) *Attorney, Agent, or Firm* — Merchant & Gould P.C.

(57) ABSTRACT

Client analytics-driven dynamic channel assignment may be provided. At a client, Radio Frequency (RF) channels may be scanned to detect access points of a network. A subset of the access points belonging to a same Extended Set Service (ESS) of the network may be determined based on data collected from the access points during the scan. For each access point in the subset, a Channel Quality Index (CQI) may be measured for an RF channel assigned to the access point, and a non-preferred channel report may be generated based on the CQI. The non-preferred channel report may be transmitted from the client to a network management system for use in dynamic channel assignment.

20 Claims, 5 Drawing Sheets

(56) References Cited

U.S. PATENT DOCUMENTS

| | | | |
|---|---|---|---|
| 9,980,296 B2 | 5/2018 | Wang et al. | |
| 10,050,762 B2 | 8/2018 | Mack et al. | |
| 2007/0217377 A1* | 9/2007 | Takeuchi | H04W 48/20 370/338 |
| 2014/0036841 A1* | 2/2014 | Gray | H04W 24/10 370/329 |
| 2014/0086081 A1* | 3/2014 | Mack | H04L 5/006 370/252 |
| 2015/0163732 A1* | 6/2015 | Chisu | H04W 48/20 455/435.1 |
| 2015/0327328 A1* | 11/2015 | Novak | H04W 88/04 455/11.1 |
| 2015/0351115 A1* | 12/2015 | Jeon | H04W 16/14 455/450 |
| 2015/0359008 A1* | 12/2015 | Wang | H04W 74/0875 370/330 |
| 2017/0367102 A1* | 12/2017 | Amini | H04W 16/10 |
| 2018/0227811 A1* | 8/2018 | Nagasaka | H04W 36/0066 |
| 2019/0253984 A1* | 8/2019 | Cariou | H04W 52/36 |
| 2019/0320494 A1* | 10/2019 | Jayawardene | H04L 5/0007 |
| 2020/0396695 A1* | 12/2020 | Bhushan | H04W 52/243 |
| 2021/0014732 A1* | 1/2021 | Chen | H04W 48/20 |

OTHER PUBLICATIONS

Cisco, Radio Resource Management White Paper, Dynamic Channel Assignment (DCA) and Transmit Power Control (TPC) Algorithm, First Published: Feb. 18, 2016 and Last Modified: Jun. 14, 2016, Chapters 6 and 7, pp. 53-82.

Santosh Kulkarni, et al.; "Radiofrequency Trends Aware Dynamic Bandwidth Selection", Technical Disclosure Commons, Jan. 30, 2019. https://www.tdcommons.org/dpubs_series/1922.

U.S. Appl. No. 16/118,667, Channel Selection for Dynamic-Frequency-Selection Channels Using Puncturing, filed Aug. 31, 2018, 27 pages.

* cited by examiner

DYNAMIC CHANNEL ASSIGNMENT DRIVEN BY CLIENT ANALYTICS

TECHNICAL FIELD

The present disclosure relates generally to distributed dynamic channel assignment in wireless networks.

BACKGROUND

Radio Resource Management (RRM) may be implemented in a wireless network to perform distributed dynamic channel assignment, among other tasks, to help manage co-channel interference, radio resources, and other radio transmission characteristics. For example, as part of RRM, access points of the wireless network may report a neighbor access point channel and transmit power to a controller. The controller may run RRM processes to dynamically assign a best Radio Frequency (RF) channel and a transmit power for each access point. Measurements of the RF environment collected and provided by the access points may be used as input for the RRM processes.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Client analytics-driven dynamic channel assignment may be provided. At a client, Radio Frequency (RF) channels may be scanned to detect access points of a network. A subset of the access points belonging to a same Extended Service Set (ESS) of the network may be determined based on data collected from the access points during the scan. For each access point in the subset, a Channel Quality Index (CQI) may be measured for an RF channel assigned to the access point, and a custom non-preferred channel report may be generated based on the CQI. The custom non-preferred channel report may be transmitted from the client to a network management system for use in dynamic channel assignment.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As part of Radio Resource Management (RRM) for a wireless network, processes may be run to dynamically assign a best Radio Frequency (RF) channel and a transmit power for each access point of the wireless network, where inputs for the processes are traditionally measurements of the RF environment collected by the access points. However, by utilizing inputs provided by access points (e.g., measurements collected from viewpoints of access points), a less than ideal wireless coverage or optimal channel plan for clients may result due to a lack of consideration of floor level data where the clients are often located. For example, in environments such as high ceiling conference rooms, auditoriums, and stadium venues, among other similar examples, where access points are elevated many feet above the floor and have directional antennas positioned towards the floor to provide network coverage to clients on the floor, neighbor relationships between access points are often completely absent. This may create hidden-node scenarios where a client on the floor observes multiple access points operating on overlapping frequencies (e.g., on a same RF channel). These access points may create co-channel contention on the floor and cause channel capacity degradation. However, because traditional measurements are collected from the access points elevated many feet above the floor, the floor level data is not captured, the co-channel contention is not detected, and channels with higher co-channel interference may be inappropriately assigned to access points resulting in less than optimal quality and performance, and a degraded user experience.

Embodiments of the disclosure provide dynamic channel assignment that is driven by measurements of the RF environment collected and provided by clients of the wireless network (e.g., measurements collected from viewpoints of clients on the floor). For example, a client within a site served by the wireless network may measure a Channel Quality Index (CQI) of each RF channel assigned to a subset of access points belonging to a same Extended Service Set (ESS) of the network that are detected by the client. Based on the measured CQI, the client may generate a custom non-preferred channel report by leveraging a non-preferred enforcement mechanism of a Wi-Fi Agile Multiband Operation (MBO) certification. Data from the custom non-preferred channel report may be extracted and, in some embodiments, aggregated with data from custom non-preferred channel reports generated by other clients in the site, to drive dynamic channel assignment. For example, an RRM system may use the data from the custom non-preferred report(s) to update a set of RF channels available for assignment to access points within the site in order to increase channel quality and performance to enhance user experience.

Figure 1:
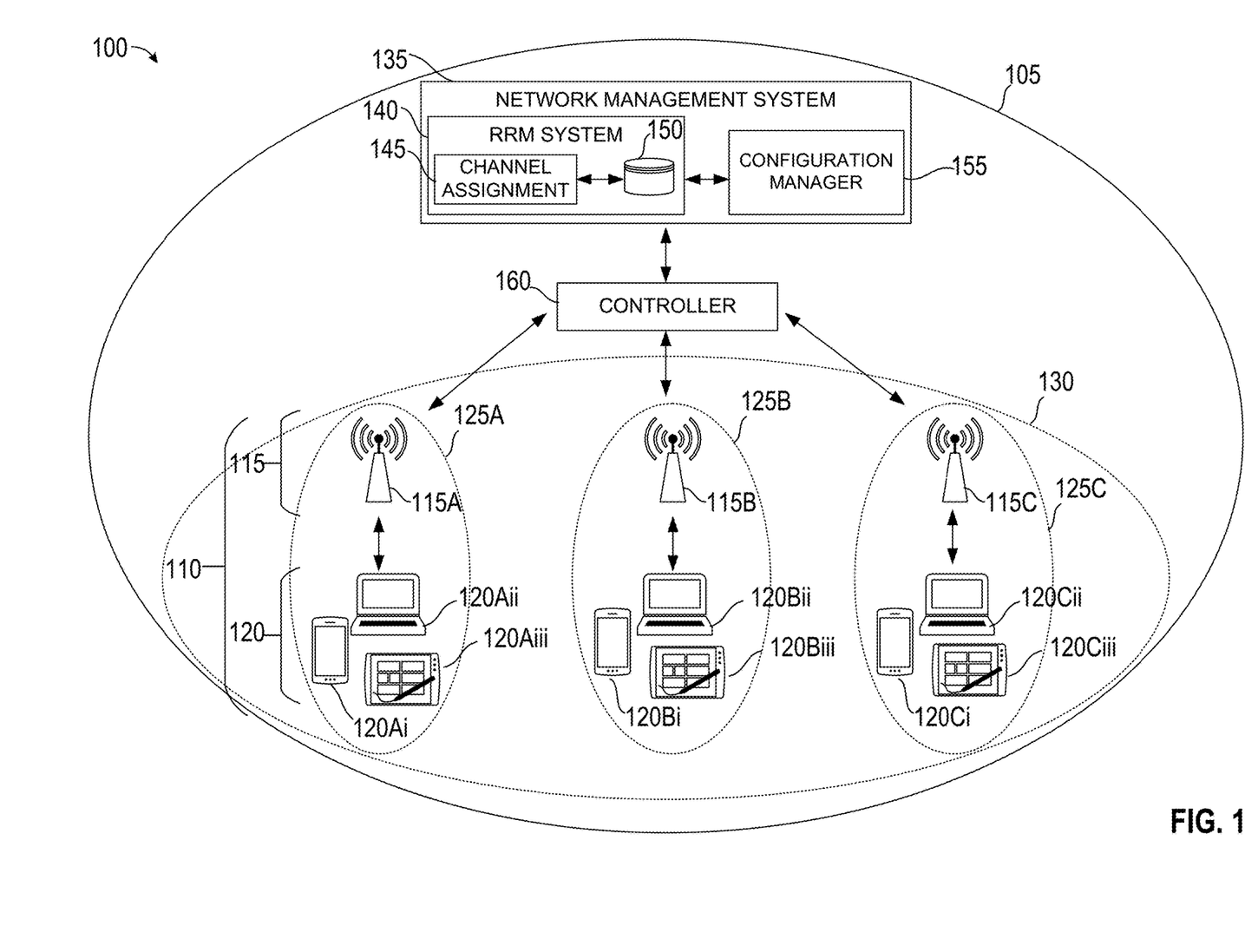
FIG. 1 shows an operating environment for client analytics-driven dynamic channel assignment.

FIG. 1 shows an operating environment 100 for client analytics-driven dynamic channel assignment. As shown in FIG. 1, operating environment 100 may comprise a network 105. Network 105 may comprise at least a plurality of stations 110 forming Basic Service Sets (BSSs) 125A-C and an ESS 130, a network management system 135 that includes a RRM system 140 and a configuration manager 155, and a controller 160.

Network 105 may be a Wireless Local Area Network (WLAN) serving a defined area, such as a home, a conference room, an office building, a school, a stadium, or other similar venue. Stations 110 may include components capable of connecting to network 105. For example, stations 110 may be equipped with Wireless Network Interface Controllers (WNICs) that enable the connection to network 105. Access points 115 and clients 120 may be two example types of stations 110. Access points 115 may be networking hardware devices that enable other devices, such as clients 120, to connect to network 105. Example clients 120 may include a desktop computer, a laptop computer, a tablet computer, a smart phone, or wearable computing device, among other similar devices capable of accessing and using network 105 via access points 115.

BSSs 125A-C may be sets of stations 110, each set consisting of a single access point and one or more clients associated to (e.g., connected to) the access point. As illustrated, a first BSS 125A may include an access point 115A and associated clients 120Ai, 120Aii, 120Aiii. A second BSS 125B may include an access point 115B and associated clients 120Bi, 120Bii, 120Biii. A third BSS 125C may include an access point 115C and associated clients 120Ci, 120Cii, 120Ciii. Each of BSSs 125A-C may have a Basic Service Set Identifier (BSSID). For example, the BSSID may be a Media Access Control (MAC) address assigned to the WNIC of the respective access point of the BSS.

In some embodiments, BSSs 125A-C on a common logical network segment may be connected to form ESS 130. ESS 130 may have an Extended Service Set Identifier (ESSID), which may be a name or other similar label for network 105. The ESSID may be broadcast by access points 115 of ESS 130 in beacon frames and/or probe responses to announce a presence of network 105. Accordingly, access points, such as access points 115 broadcasting a same ESSID, may be determined to belong to the same ESS 130 of network 105.

Access points 115 of ESS 130 may be connected via a distribution system to increase coverage of network 105. For example, even as clients 120 physically change locations, they may still remain connected to network 105 because clients 120 may roam from one access point to another within access points 115 connected by the distributed system. For example, if client 120Ai is roaming and senses that radio signals from access point 115A are getting weaker, client 120Ai may find a new access point with stronger signals (e.g., access point 115B).

Wi-Fi Agile Multiband Operation (MBO) and Wi-Fi Optimized Connectivity Experience (OCE) may be two example certifications providing features that help intelligently steer clients 120 and improve roaming between access points 115 of ESS 130. For example, MBO may help clients 120 choose a best band of RF channels at association and during roaming operations, and OCE may reduce an amount of overhead caused by network information and discovery.

One mechanism of the MBO may include a non-preferred channel enforcement mechanism that enables clients 120 to generate a list of non-preferred channels that the respective client is unable to support (e.g., is unable to operate on) due to a limitation of the client's Wi-Fi chipset. In some examples, the list of non-preferred channels that the respective client cannot support may be generated as part of a non-preferred channel report, hereinafter referred to as a standard non-preferred channel report. The standard non-preferred channel report may include a preference and reason code associated with each channel in the list, where the preference may be a preference value for the channel and the reason code may be related to the client's inability to support the channel.

As described in greater detail in conjunction with FIG. 2 below, the non-preferred enforcement mechanism of the MBO may be leveraged to enable clients 120 to generate another type of non-preferred channel report, hereinafter referred to as a custom non-preferred channel report. The custom non-preferred channel report includes, among other things, a list of non-preferred channels due to co-channel contention or other undesirable traits associated with the channels (e.g., high channel utilization, high noise floor, or observed radar pulse). Unique preference and reason code fields may be utilized to distinguish the custom non-preferred channel reports from the standard non-preferred channel reports generated via MBO.

Network management system 135 may be responsible for configuring and managing various aspects of network 105 to enhance performance and increase optimization of network 105. For example, a channel assignment component 145 of RRM system 140 may perform distributed Dynamic Channel Assignment (DCA), whereby a set of RF channels providing high performance and minimal interference based on current environment conditions of network 105 may be determined. In some embodiments, the determination may be based on data extracted from the custom non-preferred channel reports generated by clients 120. The data extracted may be stored and/or aggregated in a RF telemetry database 150 of RRM system 140. In further embodiments, a DCA list may be generated that comprises information, including configuration settings, based on the set of RF channels determined. Configuration manager 155 may assist RRM system 140 in generating the DCA list and transmitting the DCA list to controller 160.

Controller 160 may be a WLAN controller that manages and configures access points 115 of network 105, including assignment of access points 115 to respective channels based on the DCA list. Additionally, controller 160 may help steer clients 120 during roaming (e.g., during a transition of clients 120 between BBSs 125A-C within ESS 130). For example, controller 160 may avoid steering clients 120 toward access points that are assigned to a non-preferred channel that clients are unable to operate on (e.g., extracted from the standard non-preferred channel reports generated by clients 120). Additionally, when setting new channels for BSSs 125A-C, controller 160 may avoid setting one of the non-preferred channels of the clients 120 associated with the BBSs 125A-C as the new channel.

The elements described above of operating environment 100 (e.g., stations 110, access points 115, clients 120, BSSs 125A-C, ESS 130, network management system 135, RRM system 140, channel assignment component 145, RF telemetry database 150, configuration manager 155, and controller 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

While network 105 in operating environment 100 is described as a WLAN, embodiments of client analytics-driven dynamic channel assignment, as described herein, may also be applied to other wireless networks. For example, the embodiments may be applied in personal area networks, wide area networks, and cellular networks, among other similar wireless networks.

Figure 2:
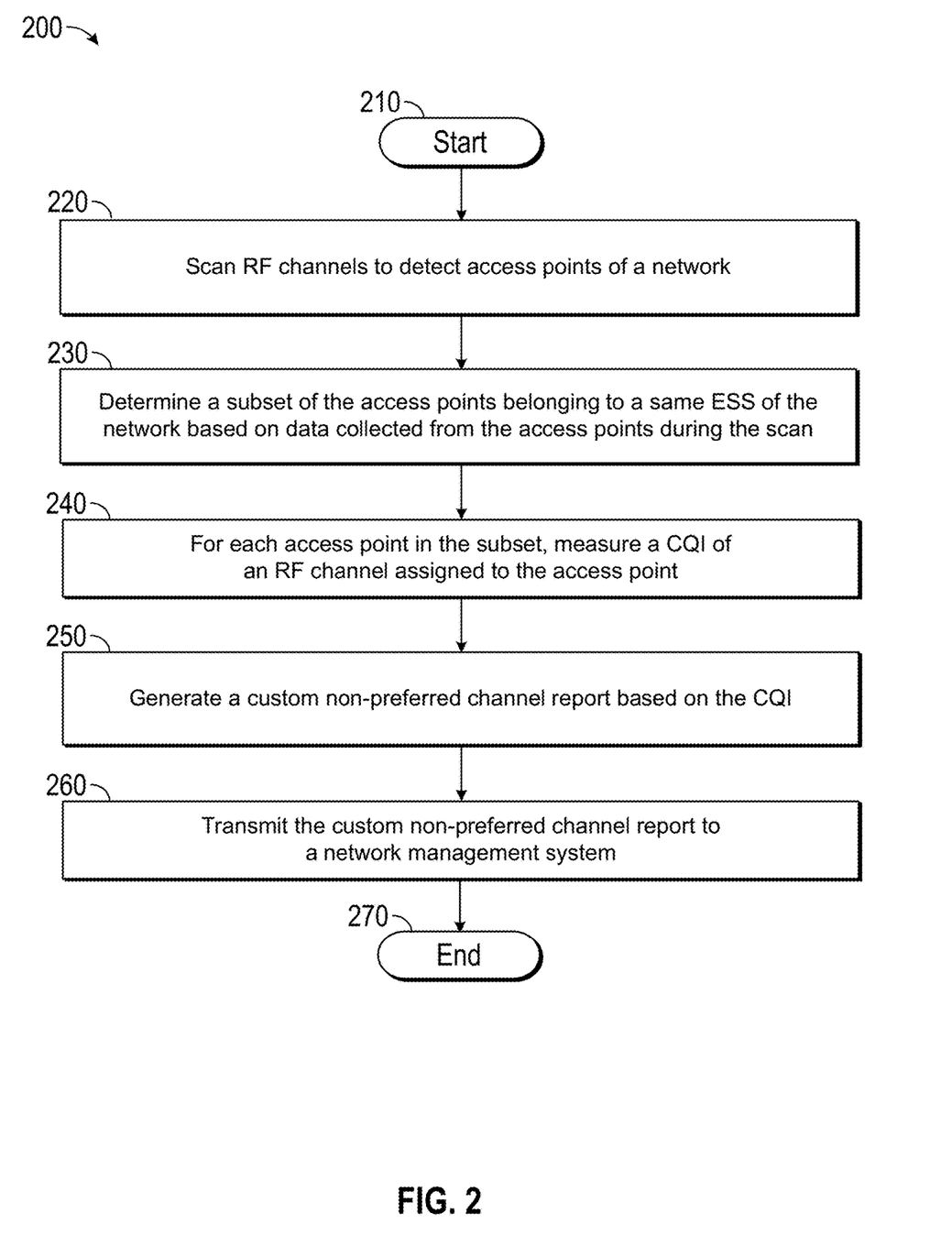
FIG. 2 is a flow chart of a method for obtaining client analytics for use in dynamic channel assignment.

FIG. 2 is a flow chart setting forth the general stages involved in a method 200 consistent with embodiments of the disclosure for obtaining client analytics for use in dynamic channel assignment. Method 200 may be implemented using a client, such as client 120Ai, that is capable of connecting to network 105 via an access point, such as access point 125A. Ways to implement the stages of method 200 will be described in greater detail below.

Method 200 may begin at starting block 210 and proceed to stage 220 where client 120Ai may scan RF channels to detect access points of network 105. The detected access points may be comprised of access points that may be heard from a location of client 120Ai (e.g., a floor). The detected access points may include access points 115, as well as other access points of network 105 or access points of other networks. In some embodiments, client 120Ai may passively scan the RF channels listening for beacon frames transmitted by the access points. In other embodiments, client 120Ai may actively scan RF channels by sending a probe request for the access points to respond to (e.g., via a probe response). A rate at which client 120Ai scans the RF channels may be based on a motion associated with client 120Ai. For example, if client 120Ai is moving, then the RF channels may be scanned more periodically (e.g., over shorter time intervals).

Additionally, in some embodiments, client 120Ai may scan all available RF channels. In other embodiments, the access points may send client 120Ai a list of RF channels on which the access points operate. For example, the list may be a Dynamic Channel Assignment (DCA) Channel List via an 802.11k neighbor report or association response. Client 120Ai may limit scanning to only the RF channels within the list.

From stage 220, where the access points are detected, method 200 may advance to stage 230 where a subset of the access points 115 belonging to a same ESS 130 of network 105 may be determined based on data collected from the detected access points during the scan. For example, while scanning the RF channels, client 120Ai may collect data from the beacon frames and/or probe responses transmitted by the access points. Among other types of data, each beacon frame or probe response may include an ESSID and a channel associated with a respective transmitting access point. The ESSID may be a name or other similar label for a network the respective transmitting access point is connected to. The channel may be an RF channel assigned to the respective transmitting access point (e.g., the RF channel that the respective transmitting access point is operating on). Client 120Ai may store the ESSIDs and channels for the detected access points, among other data, in a table.

Client 120Ai may determine the subset of the access points 115 that belong to the same network 105 based on the ESSIDs stored in the table. For example, the subset of access points 115 may include each access point having a same ESSID. Additionally, client 120Ai may determine an RF channel assigned to each access point of the subset of access points 115 based on the table.

Once the subset of access points 115 is determined in stage 230, method 200 may continue to stage 240 where client 120Ai may measure a CQI of the RF channel assigned to each access point in the subset. The CQI may generally indicate how good or bad the RF channel is from the viewpoint of client 120Ai (e.g., how good or bad the RF channel is on the floor), which may further inform whether or not the RF channel is a non-preferred channel. For example, high CQIs may indicate a general goodness of the RF channel, while low CQIs may indicate a general badness and thus non-preferred status of the RF channel. The CQI for each RF channel may be measured or computed based on one or more parameters determined by client 120Ai. In some examples, the parameters may have varying weights in the CQI computation. The parameters may include a number of Overlapping Basic Service Sets (OBSSs), an average signal strength of each OBSS, a channel utilization, a noise floor, and a radar pulse observation, each discussed in turn below.

The number of OBSSs is a number of access points determined to be operating on the RF channel (e.g., a number of co-channel neighbors). Co-channel neighbors may create co-channel interference, which may cause channel capacity degradation and negatively impact network 105, particularly when there is an increase in contention such as in high density deployments, for example. Therefore, a higher number of OBSSs on the RF channel may lead to a lower CQI indicative of a general badness or non-preferred status of the RF channel.

In addition to the number of OBSSs, the average signal strength of each OBSS, which may be based on a proximity of each OBSS to client 120Ai, may be determined. For example, if client 120Ai observes an RF channel having ten OBSSs with a weaker signal strength (e.g., a Received Signal Strength Indicator (RSSI) of less than −85 decibel-milliwatts (dBm)), that RF channel may have a higher CQI than an RF channel having three OBSSs with a stronger signal strength (e.g., a RSSI greater than −50 dBm).

Client 120Ai may determine channel utilization based on a Quality of Service (QOS) enhanced Basic Service Set (QBSS) load element. For example, the QBSS load element may be advertised in the beacon frames and/or probe responses transmitted by access points 115. The QBSS load element defines, among other information, the channel utilization. The channel utilization may represent a percentage of time that the respective access point sensed the RF channel to which it is assigned was busy. The busier or more congested the RF channel is, the more degraded the quality and performance may become. Therefore, a higher percentage of channel utilization may lead to a lower CQI indicative of a general badness or non-preferred status of the RF channel.

Client 120Ai may determine noise floor based on a summation of all noise sources and unwanted signals (e.g., any signal other than the signals being transmitted between client 120Ai and access point operating on the RF channel). A high noise floor may negatively affect a Signal-to-Noise-plus-Interference Ratio (SINR) of uplink and downlink frames, which forces client 120Ai to operate at a lower Modulation Coding Scheme (MCS). Operating at the lower MCS decreases data transmission speed, and therefore degrades performance. Accordingly, a higher noise floor may lead to a lower CQI indicative of a general badness or non-preferred status of the RF channel.

To perform radar pulse observation, client 120Ai may scan and report an observed radar pulse over the RF channel.

RF channels with higher pulse detected (e.g., a higher frequency of pulses within a predetermined time period) may be more susceptible to higher amounts of changes within the RF channel, which may negatively impact quality and performance. Therefore, observation of radar pulse may lead to a lower CQI indicative of a general badness or non-preferred status of the RF channel.

Once the CQI for the RF channel assigned to each access point of the subset of access points 115 is measured in stage 240, method 200 may continue to stage 250 where client 120Ai may generate a custom non-preferred channel report based on the CQI. In some embodiments, a non-preferred enforcement mechanism of a MBO certification may be leveraged by client 120Ai to generate the custom non-preferred channel report. Traditionally, client 120Ai may utilize the non-preferred enforcement mechanism to generate a standard non-preferred channel report that includes a list of non-preferred channels that client 120Ai cannot support (e.g., channels client 120Ai cannot operate on due to limitations of client's Wi-Fi chipset). Here, client 120Ai may additionally utilize the non-preferred enforcement mechanism to generate the custom non-preferred channel report that includes a non-preferred list of channels with high co-channel contention or other similar undesirable traits determined from the parameters, such as high channel utilization, high noise floor, or observed radar pulse. In some examples, the custom non-preferred channel report may also include CQI metrics for each RF channel. To differentiate between the two reports generated, the custom non-preferred channel report may include unique preference and reason code fields. For example, the preference may include CQI metrics and the reason code may indicate the RF channel is a non-preferred channel due to co-channel contention (or other undesirable traits determined from the parameters), rather than inability to support.

To generate the non-preferred channel list, client 120Ai may order the RF channels from highest to lowest CQI, where RF channels with the lower CQIs represent the non-preferred channels. CQI metrics for each RF channel may be presented in several different ways. In one example embodiment, values for the parameters determined for each RF channel may be provided individually in the custom non-preferred channel report. In another example embodiment, the values for the parameters may be summed or otherwise aggregated to compute a single CQI value for each RF channel to provide in the custom non-preferred channel report. In a further example embodiment, the single CQI value may be determined and compared to a predetermined threshold CQI value. Each RF channel having a CQI value that falls below the threshold CQI value may be determined to be a bad channel and indicated as a non-preferred channel in the custom non-preferred channel report (e.g., rather than providing parameter or CQI values).

Once the custom non-preferred channel report is generated at stage 250, method 200 may proceed to stage 260 where client 120Ai may transmit the custom non-preferred channel report to network management system 135. For example, client 120Ai may transmit the report via access point 125A to controller 160, and controller 160 may transmit the report to network management system 135. RRM system 140 of network management system 135 may utilize the custom non-preferred channel report for dynamic channel assignment. For example, channel assignment component 145 of RRM system 140 may update a set of RF channels available for assignment to access points 115 to exclude any non-preferred channels in the list. In some embodiments, data from the custom non-preferred channel report provided by client 120Ai may be aggregated with data from custom non-preferred channel reports provided by other clients associated to access points 115, and the set of RF channels may be updated based on the aggregated data, as described in greater detail below in conjunction with FIG. 3.

Once the custom non-preferred channel report is transmitted to network management system 135 at stage 260, method 200 may then end at stage 270. In some examples, method 200 may be performed by client 120Ai periodically at predetermined time intervals. In other examples, method 200 may be performed in response to a request for the custom non-preferred channel report from network management system 135 or controller 160.

Figure 3:
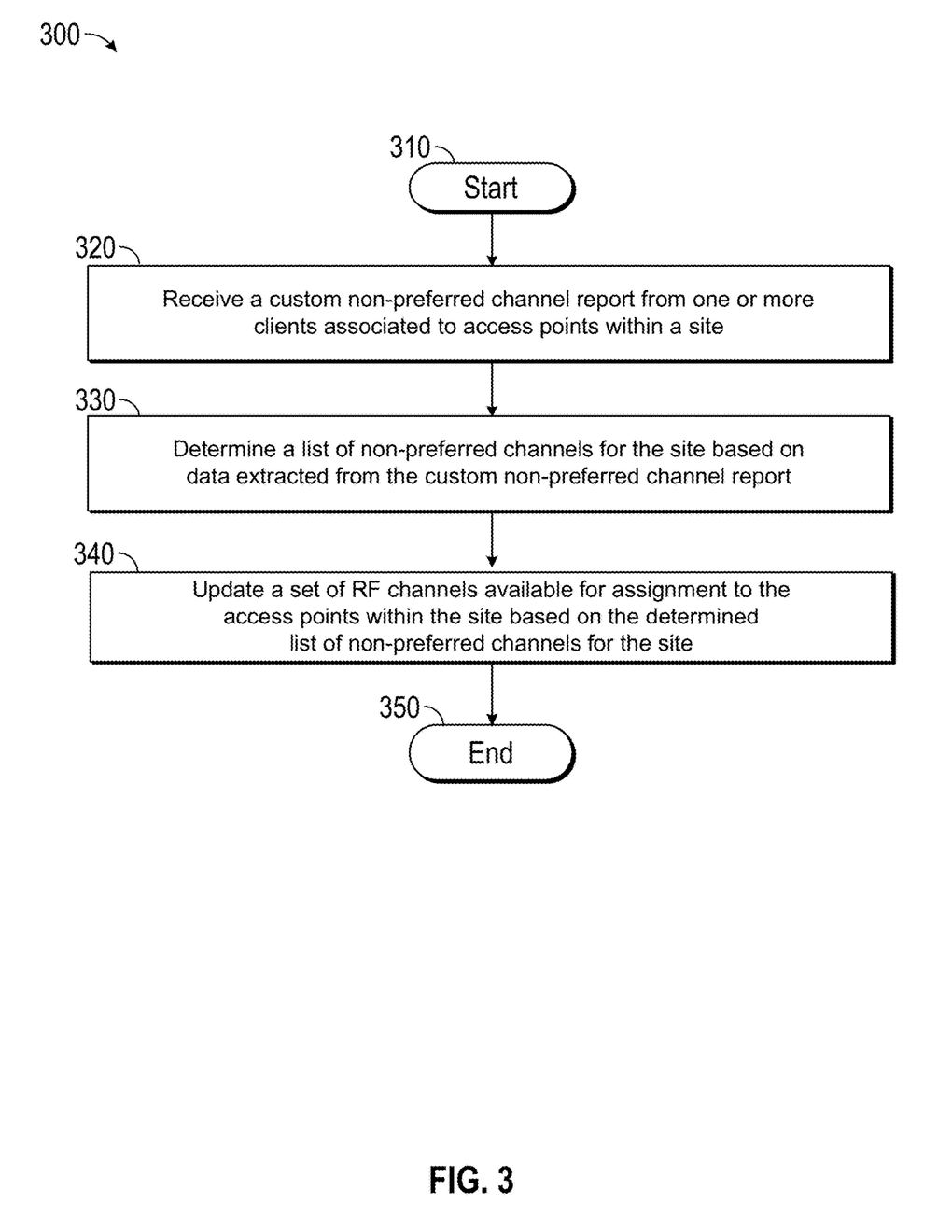
FIG. 3 is a flow chart of a method for performing client analytics-driven dynamic channel assignment.

FIG. 3 is a flow chart setting forth the general stages involved in a method 300 consistent with embodiments of the disclosure for performing client analytics-driven dynamic channel assignment. Method 300 may be implemented using RRM system 140 and configuration manager 155 of network management system 135. Ways to implement the stages of method 300 will be described in greater detail below.

Method 300 may begin at starting block 310 and proceed to stage 320 where RRM system 140 may receive a custom non-preferred channel report, such as the custom non-preferred channel report generated at stage 250 and transmitted to network management system 135 at stage 260 of method 200, from one or more clients 120 associated to access points 115 within a site. In some examples, the site may be an area served by network 105 and clients 120 may be associated to access points 115 at different locations within the site. Data from each custom non-preferred channel report received, including one or more of a list of non-preferred channels and CQI metrics, may be extracted and stored in RF telemetry database 150 of RRM system 140. In some embodiments, the data may be aggregated within RF telemetry database 150, as described in more detail below.

From stage 320 where the non-preferred channel report is received, method 200 may advance to stage 330 where channel assignment component 145 of RRM system 140 may determine a list of non-preferred channels for the site based on the data extracted from the custom non-preferred channel report (e.g., the data stored in RF telemetry database 150). In some embodiments, the non-preferred channels extracted from the list of each custom non-preferred channel report received may be aggregated to determine the set of non-preferred channels for the site. In other embodiments, CQIs measured for each RF channel may be extracted from each of the custom non-preferred channel reports received, and aggregated on a per RF channel basis (e.g., CQIs for a same RF channel extracted from different custom non-preferred channel reports may be aggregated) to determine whether each RF channel is a non-preferred channel for the site.

In either of the above-described embodiments, the aggregation may be weighted. For example, data extracted from the non-preferred channels reports may be weighted based on a distance or proximity of the reporting clients 120 to one or more access points 115. Additionally, the aggregation be weighted based on a number of custom non-preferred channel reports received from a total percentage of access points within a localized RF Neighborhood.

Once the list of non-preferred channels for the site are determined at stage 330, method 300 may proceed to stage 340 where channel assignment component 145 of RRM system 140 may update a set of RF channels available for assignment to access points 115 within the site based on the list of non-preferred channels for the site. For example, RRM system 140 may exclude any RF channel from the list of non-preferred channels from the updated set of RF channels.

In some embodiments, updating the set of RF channels includes updating the DCA list that comprises information, including configuration settings, based on the current set of RF channels. Configuration manager 155 may assist RRM system 140 in updating the DCA list and transmitting the DCA list to controller 160. Controller 160 may then assign access points 115 to respective channels based on the updated DCA list.

Updating the set of RF channels available for assignment based on the site-wide list of non-preferred channels may facilitate roaming of clients 120 to different locations in the site. For example, as clients 120 roam, associating with different access points 115 of network 105, channel quality and performance may be maintained as each of access points 115 within the site will be assigned to RF channels that do not conflict with the non-preferred channels reported by clients 120.

Once the set of RF channels are updated at stage 340, method 300 may then end at stage 350.

Figure 4:
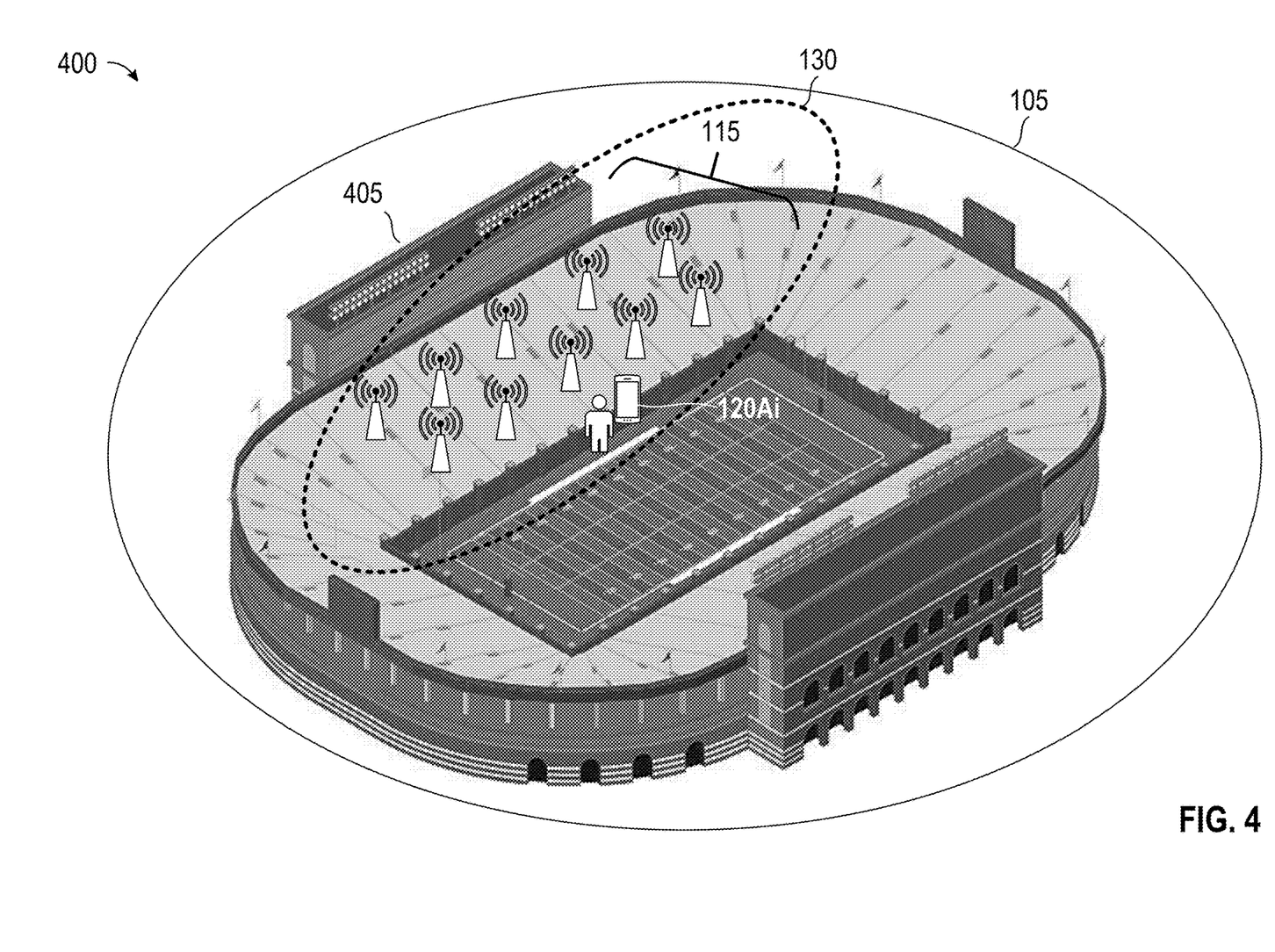
FIG. 4 is a diagram illustrating an example scenario where client analytics-driven dynamic channel assignment is implemented.

FIG. 4 is a diagram 400 illustrating an example scenario where client analytics-driven dynamic channel assignment is implemented. A user may be attending a football game at a stadium 405 and may be watching the game from a floor level of stadium 405. The user may have client 120Ai in his or her possession, and thus client 120Ai may be physically located on the floor level of stadium 405.

Network 105 serving stadium 405 may have access points 115 to enable clients 120, including client 120Ai, to connect to network 105. Access points 115 may have directional antennas that are positioned strategically to provide clients 120 with connectivity based on characteristics of the area being served. For example, due to stadium 405 having an inclined floor, it may be common for some of access points 115 to be elevated from the floor and positioned with directional antennas pointing towards the floor. With directional antennas, often neighbor relationships between access points 115 are completely absent. This creates hidden-node scenarios where a client on the floor, such as client 120Ai, observes multiple access points 115 operating on overlapping frequencies (e.g., on a same RF channel). These access points 115 may create co-channel contention on the floor and cause channel capacity degradation. As a result, the channel quality index may be highly biased on the co-channel neighbors as they directly influence interference on the floor.

If traditional methods for channel assignment are performed utilizing measurements of RF environment collected from access points 115 elevated from the floor, a less than ideal wireless coverage or optimal channel plan for client 120Ai may result due to a lack of consideration of the floor level data where client 120Ai is located. For example, because the measurements collected from access points 115 lack this floor level data, the co-channel contention described above is not detected and channels with higher co-channel interference may be inappropriately assigned to access points 115.

Embodiments as described herein ensure that the floor level data is not excluded by providing dynamic channel assignment that is driven by measurements of the RF environment provided by clients themselves who are located on the floor. For example, client 120Ai may perform method 200 to scan RF channels to detect access points of network 105 and determine a subset of the access points 115 belonging to same ESS 130 of network 105. For each of access points 115, client 120Ai may measure a CQI of an RF channel that is assigned to the access point and generate a custom non-preferred channel report based on the CQI, where the CQI measurements are from the viewpoint of client 120Ai (e.g., including floor level data).

Client 120Ai may then transmit the custom non-preferred channel report to network management system 135 for use in dynamic channel assignment. For example, the custom non-preferred channel report may include a list of non-preferred channels generated based on the CQI (e.g., a list of channels determined to have co-channel contention, high channel utilization, high noise floor, and/or observed radar pulse based on CQI measurements). Additionally, the custom non-preferred channel report may include the CQI measured for each channel. RRM system 140 of network management system 135 may perform method 300 to update a set of RF channels for assignment to access points 115 within stadium 405 based on the non-preferred channel report. For example, any channels within the list may be excluded from the set of RF channels. In some embodiments, data from the custom non-preferred channel report provided by client 120Ai may be aggregated with data from custom non-preferred channel reports provided by other clients associated to access points 115 within stadium 405, and the set of RF channels may be updated based on the aggregated data.

According to some example embodiments, RF channels may be scanned to detect access points of a network. A subset of the access points belonging to a same ESS of the network may be determined based on data collected from the access points during the scanning. For each access point in the subset, a CQI for an RF channel assigned to the access point may be measured. A custom non-preferred channel report may be generated based on the CQI. The custom non-preferred channel report may be transmitted to a network management system for use in dynamic channel assignment.

In other example embodiments, the RF channels may be passively scanned by listening for beacon frames transmitted by the access points or actively scanned by sending probe requests for the access points to respond to via probe responses. The beacon frames and/or the probe responses transmitted by the access points during the scanning may be collected, an ESSID associated with a transmitting access point from each of the beacon frames and/or the probe responses may be extracted for storage in a table, and the subset of the access points belonging to the same ESS of the network may be determined by identifying one or more access points within the table having a same ESSID. Additionally, an RF channel associated with the transmitting access point may be extracted from each of the beacon frames and/or the probe responses for storage in the table, and the RF channel assigned to each access point in the subset may be determined based on the table.

In further example embodiments, one or more parameters associated with the RF channel may be determined to measure the CQI, where the parameters include at least a number of overlapping basic service sets, an average signal strength of each overlapping basic service set, a channel utilization, a noise floor, and a radar pulse observation. In some examples, the custom non-preferred channel report generated may include values for each of the one or more parameters associated with the RF channel. In other examples, values for each of the one or more parameters associated with the RF channel may be aggregated to compute a single CQI value for the RF channel and the custom non-preferred channel report generated may include the single CQI value. The parameters may be weighted in the aggregation. In further example, a determination may be made whether the single CQI value for the RF channel meets a predetermined threshold and the custom non-preferred channel report may be generated to include an indication that the RF channel is non-preferred if the predetermined threshold is not met. A list of non-preferred channels may be generated based on the CQI measured for each RF channel.

In yet further example embodiments, the custom non-preferred channel report may be generated utilizing a non-preferred channel enforcement mechanism of MBO, where the custom non-preferred channel report may include a unique preference field and reason code.

According to other example embodiments, an apparatus may include a memory storage and a processing unit coupled to the memory storage. The processing unit may be operative to scan RF channels to detect access points of a network and determine a subset of the access points belonging to a same ESS of the network based on data collected from the access points during the scan. For each access point in the subset, the processing unit may be further operative to measure a CQI for an RF channel assigned to the access point, generate a custom non-preferred channel report based on the CQI, and transmit the custom non-preferred channel report to a network management system for use in dynamic channel assignment.

According to further example embodiments, a custom non-preferred channel report may be received from one or more clients associated to access points within a site served by a network. A list of non-preferred channels for the site may be determined based on data extracted from the custom non-preferred channel report. A set of RF channels available for assignment to the access points within the site may be updated based on the determined list of non-preferred channels for the site.

Figure 5:
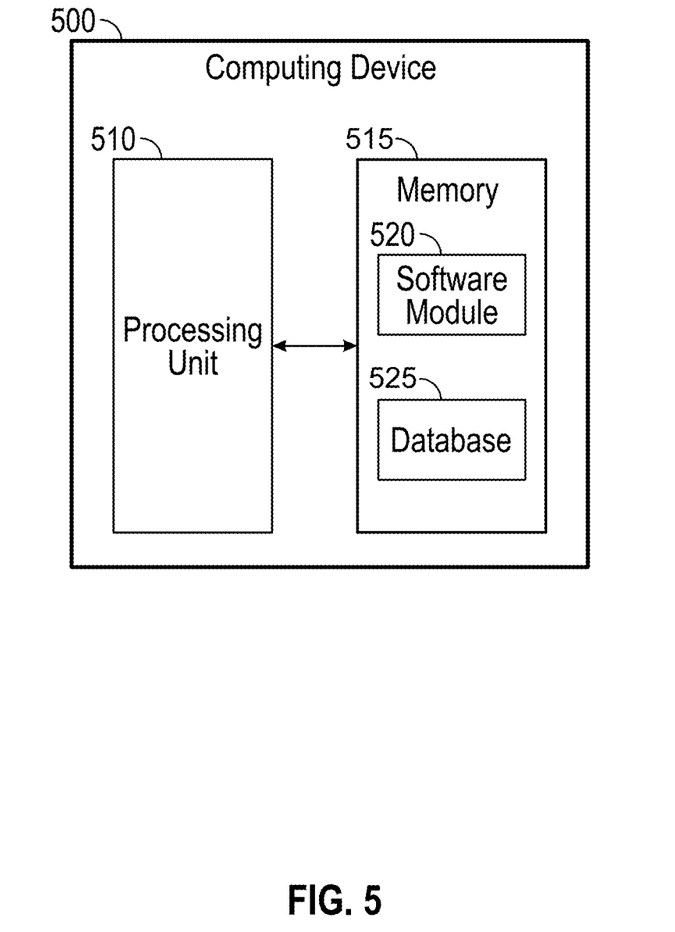
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for client analytics-driven dynamic channel assignment, including for example, any one or more of the stages from method 200 described above with respect to FIG. 2 or any one or more of the stages from method 300 described above with respect to FIG. 3. Computing device 500, for example, may provide an operating environment for elements of operating environment 100 including, but not limited to, stations 110, access points 115, clients 120, BSSs 125A-C, ESS 130, network management system 135, RRM system 140, channel assignment component 145, RF telemetry database 150, configuration manager 155, and a controller 160). Elements of operating environment 100 (e.g., stations 110, access points 115, clients 120, BSSs 125A-C, ESS 130, network management system 135, RRM system 140, channel assignment component 145, RF telemetry database 150, configuration manager 155, and a controller 160) may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a System-On-a-Chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
scanning Radio Frequency (RF) channels to detect access points of a network;
determining a subset of the access points belonging to a same Extended Service Set (ESS) of the network based on data collected from the access points during the scanning;
for each access point in the subset, measuring a Channel Quality Index (CQI) for an RF channel assigned to the access point;
generating a custom non-preferred channel report based on the CQI, wherein generating the custom non-preferred channel report based on CQI comprises:
generating a standard non-preferred channel report comprising a first list of non-preferred channels that a client device cannot support, and
generating the custom non-preferred channel report comprising a second list of non-preferred channels with a predetermined trait determined from the CQI; and
transmitting the custom non-preferred channel report to a network management system for use in dynamic channel assignment.

2. The method of claim 1, wherein scanning the RF channels comprises one or more of:
passively scanning the RF channels by listening for beacon frames transmitted by the access points; and
actively scanning the RF channels by sending probe requests for the access points to respond to via probe responses.

3. The method of claim 2, wherein determining the subset of the access points belonging to the same ESS of the network based on the data collected from the access points during the scanning comprises:
collecting the beacon frames and the probe responses transmitted by the access points during the scanning;
extracting an Extended Service Set Identifier (ESSID) associated with a transmitting access point from each of the beacon frames and the probe responses for storage in a table; and
determining the subset of the access points by identifying one or more access points within the table having a same ESSID.

4. The method of claim 3, further comprising:
extracting the RF channel associated with the transmitting access point from each of the beacon frames and the probe responses for storage in the table; and
determining the RF channel assigned to each access point in the subset based on the table.

5. The method of claim 1, wherein measuring the CQI for the RF channel comprises determining one or more parameters associated with the RF channel, the one or more parameters including:
a number of overlapping basic service sets;
an average signal strength of each overlapping basic service set;
a channel utilization;
a noise floor; and
a radar pulse observation.

6. The method of claim 5, wherein generating the custom non-preferred channel report comprises including values for each of the one or more parameters associated with the RF channel in the custom non-preferred channel report.

7. The method of claim 5, further comprising:
aggregating values for each of the one or more parameters associated with the RF channel to compute a single CQI value for the RF channel; and
generating the custom non-preferred channel report to include the single CQI value.

8. The method of claim 7, wherein the one or more parameters are weighted in the aggregation.

9. The method of claim 7, further comprising:
determining whether the single CQI value for the RF channel meets a predetermined threshold; and
generating the custom non-preferred channel report to include an indication that the RF channel is non-preferred if the predetermined threshold is not met.

10. The method of claim 1, wherein generating the custom non-preferred channel report comprises generating a list of non-preferred channels based on the CQI measured for each RF channel.

11. The method of claim 1, wherein generating the custom non-preferred channel report comprises utilizing a non-preferred channel enforcement mechanism of Wi-Fi Agile Multiband Operation (MBO) to generate the custom non-preferred channel report, the custom non-preferred channel report including a unique preference field and reason code.

12. An apparatus comprising:
a memory storage; and
a processing unit coupled to the memory storage, wherein the processing unit is operative to:
scan Radio Frequency (RF) channels to detect access points of a network;

determine a subset of the access points belonging to a same Extended Service Set (ESS) of the network based on data collected from the access points during the scan;

for each access point in the subset, measure a Channel Quality Index (CQI) for an RF channel assigned to the access point;

generate a custom non-preferred channel report based on the CQI, wherein the processing unit being operative to generate the custom non-preferred channel report based on CQI comprises the processing unit being operative to:

generate a standard non-preferred channel report comprising a first list of non-preferred channels that a client device cannot support, and generate the custom non-preferred channel report comprising a second list of non-preferred channels with a predetermined trait determined from the CQI; and transmit the custom non-preferred channel report to a network management system for use in dynamic channel assignment.

13. The apparatus of claim 12, wherein the apparatus is a client connected to the network via one of the access points of the network.

14. The apparatus of claim 12, wherein the non-preferred channel report includes one or more of a list of non-preferred channels and the CQI measured for the RF channel assigned to each access point in the subset of access points.

15. The apparatus of claim 12, wherein the network management system updates a set of RF channels available for assignment to the subset of the access points based on the non-preferred channel report.

16. A method comprising:

receiving a custom non-preferred channel report from one or more clients associated to access points within a site served by a network;

determining a list of non-preferred channels for the site based on data extracted from the custom non-preferred channel report, wherein generating the list of non-preferred channel report based on the data extracted from the non-preferred channel report comprises:

generating a standard non-preferred channel report comprising another list of non-preferred channels that a client device cannot support, and generating the custom non-preferred channel report comprising the list of non-preferred channels with a predetermined trait; and updating a set of Radio Frequency (RF) channels available for assignment to the access points within the site based on the determined list of non-preferred channels for the site.

17. The method of claim 16, wherein receiving the custom non-preferred channel report comprises receiving, from each of the one or more clients, one or more of a list of non-preferred channels and a Channel Quality Index (CQI) measured for each RF channel assigned to an access point in a subset of access points detected by the client and determined to belong to a same Extended Service Set (ESS) of the network.

18. The method of claim 17, wherein determining the list of non-preferred channels for the site based on the data extracted from the custom non-preferred channel report comprises:

extracting the non-preferred channels from the list of non-preferred channels within each custom non-preferred channel report received; and aggregating the extracted non-preferred channels to determine the list of non-preferred channels for the site.

19. The method of claim 17, wherein determining the list of non-preferred channels for the site based on the data extracted from the non-preferred channel report comprises:

extracting the CQI measured for each RF channel from each custom non-preferred channel report received; and aggregating the extracted CQI on a per RF channel basis to determine whether each RF channel is a non-preferred channel for the site.

20. The method of claim 16, wherein updating the set of RF channels comprises:

updating a Dynamic Channel Assignment (DCA) list; and providing the DCA list to a controller that is operable to assign the set of RF channels to the access points within the site based on the updated DCA list.

* * * * *